United States Patent [19]

Hunter et al.

[11] 3,973,442

[45] Aug. 10, 1976

[54] FLUIDIC DIRECT-IMPACT MODULATOR ACCELEROMETER

[75] Inventors: Joe S. Hunter, Huntsville; Escar L. Bailey, Athens; Little J. Little, Huntsville, all of Ala.

[73] Assignee: The United States of America as represented by the Secretary of the Army, Washington, D.C.

[22] Filed: Nov. 28, 1975

[21] Appl. No.: 635,824

[52] U.S. Cl. .................................. 73/515; 137/824
[51] Int. Cl.² ........................................ G01P 15/02
[58] Field of Search ........... 73/515, 516 R; 137/804, 137/824, 827, 829

[56] References Cited
UNITED STATES PATENTS 3,513,710  5/1970  Bates et al. ..................... 73/515 X
3,572,132  3/1971  Trugman ........................... 73/515

Primary Examiner—James J. Gill
Attorney, Agent, or Firm—Nathan Edelberg; Robert P. Gibson; Charles R. Carter

[57] ABSTRACT

A fluidic accelerometer employing a direct-impact modulator for measuring acceleration or velocity of a body along a specified axis of the accelerometer. This device uses two similar collinear power-input tubes directed toward each other. The axially opposing power jets from the tubes impact where the flow meets an air-bearing supported proofmass containing annular rings and produce symmetrical radial flow cones at the balance point. A change in the position of the proofmass causes the balance point to move which causes the radial flow cones to become asymmetrical and a net pressure difference is developed in the output receivers.

8 Claims, 2 Drawing Figures

FLUIDIC DIRECT-IMPACT MODULATOR ACCELEROMETER

DEDICATORY CLAUSE

The invention described herein may be manufactured, used, and licensed by or for the Government for governmental purposes without the payment to us of any royalties thereon.

BACKGROUND OF THE INVENTION

This invention relates to the field of fluidic accelerometers. Fluidic and flueric components have been of interest, particularly in the missile field, because of their inherent reliability due to the simplicity, ruggedness and lack of sensitivity to environmental conditions such as radiation, temperature, shock and vibration. There are numerous types of fluidic as well as flueric components that are used in various types of control systems, including control systems for missiles. One such flueric accelerometer is shown and discussed in U.S. Pat. No. 3,768,316 assigned to the United States Government. However such flueric systems can produce undesirable high frequency responses in an otherwise low frequency response requirement.

SUMMARY OF THE INVENTION

It is an object of this invention to provide a high density proofmass operating in conjuction with a low density fluid to achieve an accelerometer that will perform efficiently in low and medium level g environments. That is the accelerometer will be particularly useful in a system having low and medium frequency response requirements and thereby filter out undesirable high frequencies.

Another object of the invention is to provide a sigle axis accelerometer with only one moving part (proofmass) that produces an output proportional to the specific force input over the linear range of operation.

The apparatus of the present invention is a device for measuring the rate of change of velocity along an axis and producing an output differential pressure proportional thereto.

This device has two similar collinear power input tubes directed toward each other. The axially opposing power jets from the tubes impact where the flow meets an air-bearing supported proofmass containing an annular ring on each side and produce symmetrical radial flow cones at the balance point. Equal amounts of the power jet streams are deflected into each of the output receivers when the proofmass is in its reference position, resulting in a differential pressure output of zero between the two output receivers. A change in the position of the proofmass causes the balance point to move. As the balance point moves, the radial flow cones become asymmetrical and a net pressure difference is developed in the two output receivers.

An annular control flow constricts the diameter of each of the power jets to provide the control signal. If a control flow is applied to one of the power jets, momentum flux of the power jet increases (because of its smaller diameter) and the balance point of the impact modulator, thus increases as more of the radial flow is captured by the opposing output receivers. The pressure difference between the two output receivers is proportional to the applied acceleration along the sensitive axis.

This invention may be better understood from the following detailed description taken in conjunction with the accompanying drawings.

DETAILED DESCRIPTION OF THE INVENTION

Figure 1:
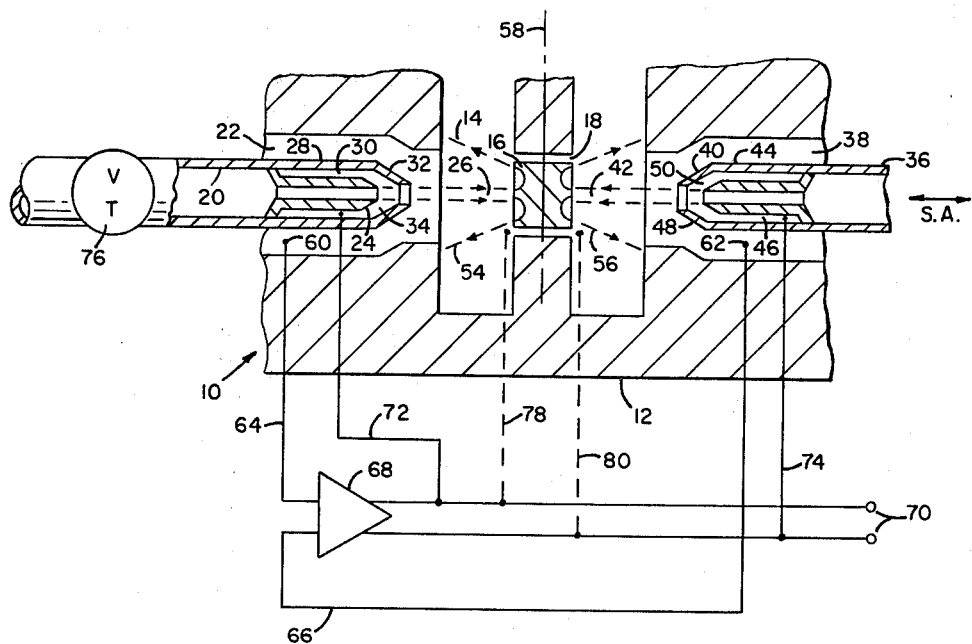
FIG. 1 is a sectional view of the fluidic direct-impact modulator accelerometer and includes the required feedback control elements.

Accelerometer 10 shown in FIG. 1 includes a housing 12 having a fluid impact chamber 14 that can be mounted on a missile or other movable object on which acceleration information is to be taken. The fluidic DIM accelerometer 10 contains only one moving part that is a proofmass 16 which is supported by an air-bearing film 18 from a supply (not shown). A power input tube 20 is mounted in a receiver chamber 22 located in housing 12 by means (not shown). Tube 20 includes a converging nozzle section 24 on one end thereof that injects an air jet 26 into chamber 14. A casing 28 mounted to tube 20 forms an annular control chamber 30 around nozzle section 24. A converging nozzle section 32 is formed on one end of casing 28 so as to cause any flow from chamber 30 to merge with the flow from nozzle 24. The section between the end of nozzle 24 and the end of nozzle 32 is a control duct 34.

A second power input tube 36 is mounted in a second receiving chamber 38 also located in housing 12. The tube 36 includes a converging nozzle section 40 that injects an air jet 42 into chamber 14. A casing 44 mounted to tube 36 forms an annular control chamber 46 around nozzle section 40. A converging nozzle section 48 is formed on the end of casing 44 to cause any flow from chamber 46 to merge with the flow from nozzle 40. The section between the end of nozzle 40 and the end of nozzle 48 is a control duct 50. The two power input tubes are arranged in opposing relation to each other and the longitudinal axes therefore collinear. Both power jet tubes are operated from a common source of air. The axially opposing power jet streams 26 and 42 impact on opposite sides of proofmass 16 containing annular rings 52 and produces symmetrical radial flow cones 54 and 56 at the balance point 58. Reflected streams from cones 54 and 56 will be collected in each of the output receivers 22 and 38. Pressure transducers 60 and 62 are placed respectively in receivers 22 and 38 and are connected by leads 64 and 66 to a flueric operational amplifier 68. The amplifier output 70 has feedback signals 72 and 74 connected thereto for directing a feedback to the appropriate control ducts 34 and 50.

In operation when under static conditions (no acceleration applied), power jet streams 26 and 42 exit from power jet tubes 20 and 36. The axially opposing power jet streams impact where the flow meets the proofmass. If the momentum of the power jet streams are the same, equal amounts of the reflected streams will be collected in each of the output receivers 22 and 38. With no acceleration applied to housing 12 the pressures sensed on the output presure transducers 60 and 62 are, essentially, equal. These pressures are directed to leads 64 and 68 of flueric operational amplifier 68. The amplifier differential output 70 is a differential pressure which is proportional to the acceleration applied to housing 12. Feedback signals 72 and 74 serve to maintain the accelerometer in a force balance state by directing a feedback to the appropriate control duct 32 or 50. A non-zero output on differential output 70, which exists when housing 12 is not being accelerated, is called bias. Any such bias may be reduced to zero by bias adjustment valve 76.

Figure 2:
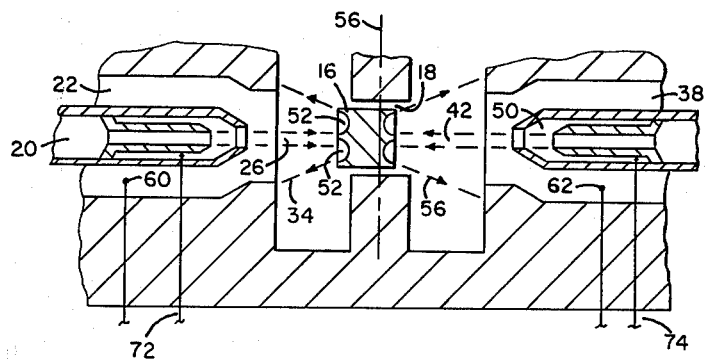
FIG. 2 illustrates the power jet steam orientation of the fluidic DIM accelerometer as it is being accelerated from left to right.

As the device is accelerated from left to right, the momentum of the right stream 42 is increased while that of the left stream 26 is decreased. This coupled with the inertia of the proofmass 16 contributes to a shifting of the balance point to the left of impact plane 58, more clearly shown in FIG. 2. The effect that the power jet streams 26 and 42 have on the shift is almost insignificant in comparison with the effect that the proofmass has on the shift. This condition increases the signal in output receiver 22 and decreases the signal in output receiver 38. These signals are detected by the output pressure transducers 60 and 62 and subsequently summed in the operational amplifier 68. After amplification by flueric operational amplifier, feedback signal 72 is applied to control duct 34, causing the momentum flux of the power stream to increase, because of its smaller diameter and the balance point of the impact modulator to move in the direction of impact plane 58, thus closing the control loop.

An alternate balancing approach would be to elminate the control ducts 34 and 50 as well as feedback signals 72 and 74 and replace them with proofmass nulling jets 78 and 80. System gain is high enough to maintain the balance point near the impact plane 58, allowing only a small error signal as an input to the operational amplifier 68. the differential output 70 is proportional to acceleration.

The fluidic DIM accelerometer produces a differential pressure which is proportional to rate of change of velocity. The accelerometer can be fixed to a missile body or other body to provide velocity information thereof in a specific direction. If it is desired to measure acceleration along a lateral plane, the accelerometer can be mounted on a stabilized platform. By stabilizing such a platform with three gyros effective along the yaw, roll, and pitch axes, its direction in space can be controlled. With this typical arrangement, it is possible to utilize the accelerometer along longitudinal and lateral axes to determine either velocity by a single integration or distance traveled by two successive integrations. The accelerometer can also be used to provide data for cutting off a rocket motor at the desired point in a flight trajectory.

The high density proofmass operating in conjunction with a low desity fluid makes the fluidic DIM accelerometer applicable for use in low and medium g missile guidance systems. The fluidic design also allows the accelerometer to operate in a high radiation enviroment without any compromise in performance. The only moving part of the system (proofmass) is suspended by an air-bearing, resulting in, essentially, zero wear on the accelerometer and increasing reliability substantially. The squeeze film effect inherent in an air-bearing causes the accelerometer to be virtually immune to damage from shock and vibration environments. The ability to adjust input impedance to values approaching infinity and maximum pressure gain to as much as 8000 adds to the versatility of the fluidic DIM accelerometer.

We claim:

1. A fluidic accelerometer for measuring acceleration along an axis of the accelerometer comprising: a housing that defines a fluid impact chamber; a pair of power jet tubes for directing two power jet fluid streams into said chamber, said power jet tubes being mounted in said housing in an opposing position so that the longitudinal axes of the tubes conincide and the power jet tubes discharge toward one another; a proofmass disposed in said chamber at a point where the axially opposing power jet streams impact the proofmass said proofmass having surfaces contoured so that the streams are reflected from the proofmass in the form of radial cones; detector means for detecting the position of said radial flow cones in said fluid impact chamber and providing signals that are indicative of the positions of said radial cones and control means that receives signals from said detector means and develops a control signal for modulating the power jet fluid streams so as to maintain the proofmass centered to produce symmetrical radial flow cones.

2. A fluidic accelerometer as set forth in claim 1 wherein said proofmass is supported by an air-bearing film.

3. A fluidic accelerometer as set forth in claim 2 wherein said detector means includes two receiver chambers formed in said housing that are in fluid communication with said fluid impact chamber, said two receiving chambers being positioned so that a receiving chamber is arranged around each power jet tube whereby movement of the radial flow cones in the fluid impact chamber will cause a pressure differential between the two receiving chambers.

4. A fluidic accelerometer as set forth in claim 3 including means for transmitting fluid signals indicative of fluid conditions in said receiving chambers from said receiving chamber to said control means.

5. A fluidic accelerometer as set forth in claim 4 wherein said transmitting means are pressure transducers.

6. A fluidic accelerometer as set forth in claim 5 wherein said control means includes a fluidic amplifier means that receives as inputs the signals from the receiving chambers and delivers an output signal in response thereto in the form of two control fluid flows.

7. A fluidic accelerometer as set forth in claim 6 including a control flow tube mounted around each power jet tube to form two control cavities, one control cavity around each power jet tube, said control cavities each having a discharge opening through which the power jet fluid stream passes when injected into the fluid impact chamber.

8. A fluidic accelerometer as set forth in claim 7 including passageway means for applying one of the two control fluid flows from the fluid amplifier means to one of the control cavities and the other control fluid flow to the other control cavity, whereby a control fluid flow can be applied to either of the two control cavities and this flow applied to the power jet stream to increase the momentum thereof as needed to maintain the radial flow cones in the fluid impact chamber.

\* \* \* \* \*